March 2, 1954 E. A. ALDERSON ET AL Re. 23,791

BOAT ANCHOR HOIST

Original Filed Aug. 29, 1950 2 Sheets-Sheet 1

INVENTORS.
ERNEST A. ALDERSON
WILLIAM L. ADAIR
BY R. W. Hodgson
AGENT

BOAT ANCHOR HOIST

Original Filed Aug. 29, 1950 2 Sheets-Sheet 2

INVENTORS
ERNEST A. ALDERSON
WILLIAM L. ADAIR
BY R. W. Hodgson
AGENT

Reissued Mar. 2, 1954 Re. 23,791

UNITED STATES PATENT OFFICE 23,791

BOAT ANCHOR HOIST

Ernest A. Alderson, Pico, and William L. Adair, Puente, Calif.

Original No. 2,605,082, dated July 29, 1952, Serial No. 182,074, August 29, 1950. Application for reissue September 20, 1952, Serial No. 310,742

3 Claims. (Cl. 254—187)

Matter enclosed in heavy brackets [ ] appears in the original patent but forms no part of this reissue specification; matter printed in italics indicates the additions made by reissue.

This invention relates to boat anchors, and more particularly to an improved boat anchor hoist mechanism.

A main object of the invention is to provide a novel and improved boat anchor unit provided with an anchor and a hoist mechanism therefor, the unit being very simple in construction, being easy to mount on a boat, and being very easy to operate.

A further object of the invention is to provide an improved boat anchor hoist device which is relatively inexpensive to manufacture, which is rugged in construction, which enables the operator to hoist anchor in a short period of time and with a minimum amount of effort, and which enables the anchor to be released instantaneously, whenever desired, by a very simple operation.

Further objects and advantages of the invention will become apparent from the following description and claims, and from the accompanying drawings, wherein:

Figure 1:
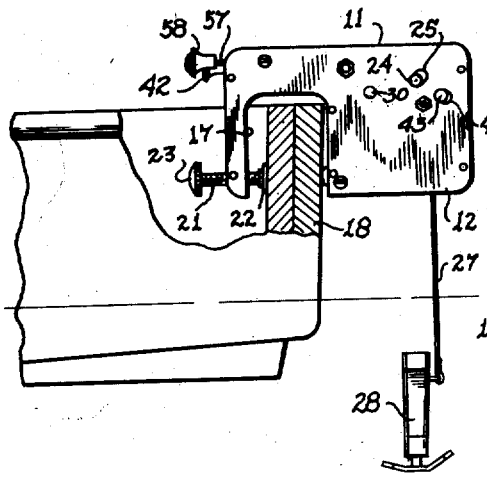
Figure 1 is an elevational view, partly broken away, of the stern portion of a boat on which is mounted an improved anchor unit constructed in accordance with the present invention.
Figure 2:
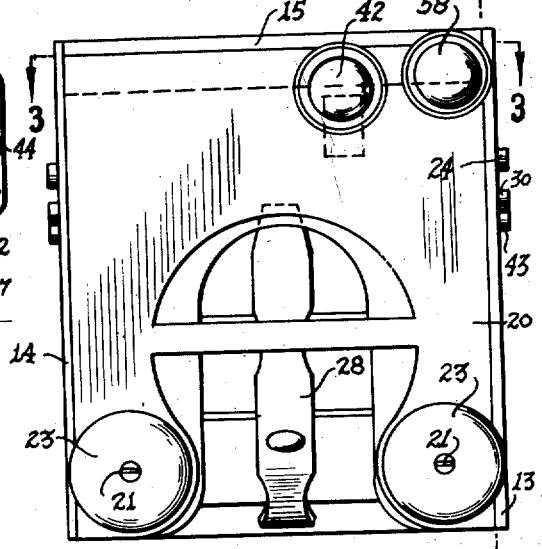
Figure 2 is an enlarged front elevational detail view of the anchor unit of Figure 1.
Figure 5:
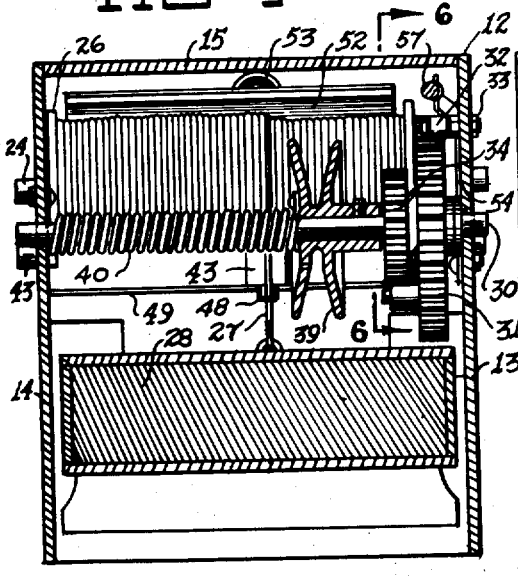
Figure 5 is a vertical cross-sectional view taken on line 5—5 of Figure 4.

Referring to the drawings, the anchor unit is generally designated at 11. The anchor unit comprises a generally rectangular housing 12 having side walls 13 and 14, a top wall 15, and a rear wall 16. The bottom of the housing is open, and the side walls of the housing are notched at 17, 17, allowing the forward portion of the housing to be fitted over the stern portion, shown at 18, of a boat in the manner illustrated in Figure 1. Designated at 19 is a transverse partition wall secured in the housing at the rear margins of the notches 17. Threaded through the forward wall of the housing, designated at 20, are the respective screw clamps 21, 21, each screw clamp being provided at its inner end with a clamping foot 22, and at its outer end with a knob 23. As shown in Figure 1, the housing 12 may be rigidly secured on the stern portion 18 of a boat by tightening the clamping screws 21 so as to provide clamping pressure between the foot elements 22 and the transverse partition wall 19. The foot elements 22 are rotatably mounted on the ends of the clamping screws 21, whereby said clamping screws may be freely rotated relative to said foot elements.

Figure 6:
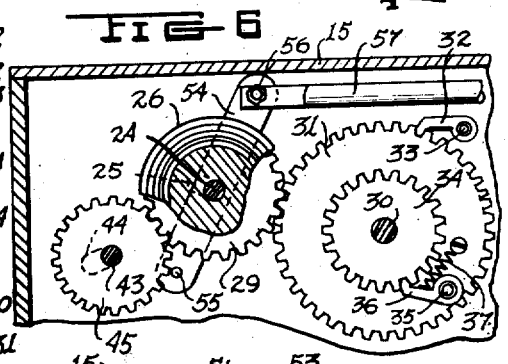
Figure 6 is a cross-sectional detail view taken on line 6—6 of Figure 5.
Figure 4:
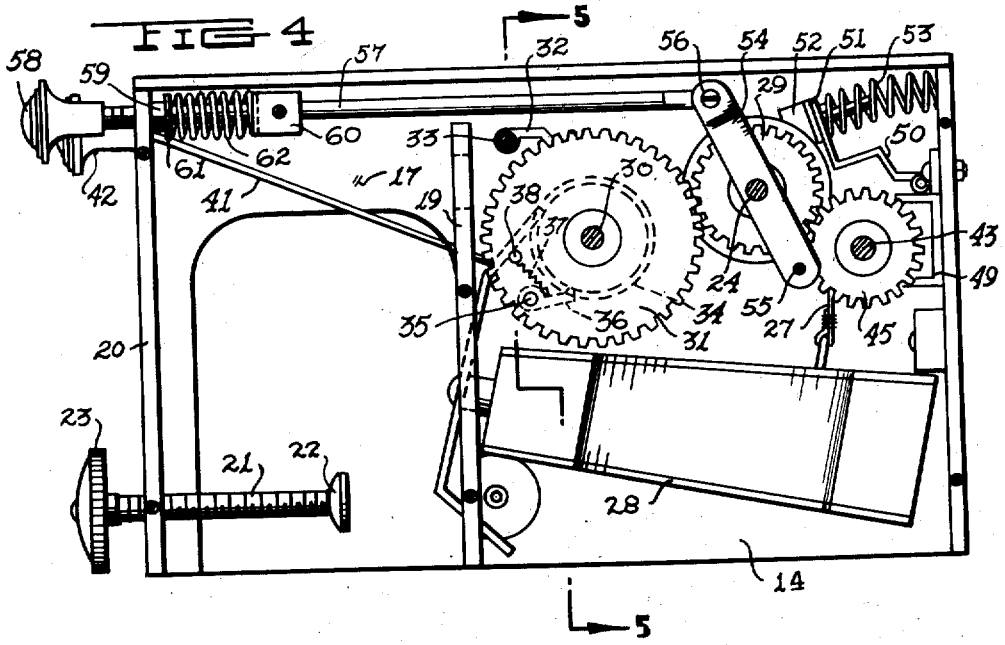
Figure 4 is a vertical cross-sectional view taken on line 4—4 of Figure 2.

Designated at 24 is a first transverse shaft which is rotatably and slidably mounted in the side walls 13 and 14 of the housing 12. As shown in Figures 1 and 6, said side walls are formed with inclined slots 25 in which the ends of the shaft 24 are rotatably and slidably received. Shaft 24 has secured thereon the discs 26, 26 which define therebetween a reel on which is wound the anchor hoist cable 27. One end of the cable is secured to the shaft 24 and the other end is secured to the anchor, shown at 28. Secured on shaft 24 is a relatively small second gear 29. Designated at 30 is a second transverse shaft rotatably mounted in the side walls 13, 14 of the housing 12. Rotatably mounted on the shaft 30 is a relatively large first gear 31 which normally is in mesh with the gear 29, as shown in Figure 4. Pivoted to the side wall 13 of the housing 12 at 33 is a second pawl or dog 32 which engages the periphery of the gear 31 and prevents rotation of said gear in a counterclockwise direction, as viewed in Figure 4, but allows the gear 31 to be rotated clockwise. Secured rigidly on shaft 30 is a third gear 34 disposed adjacent to the gear 31. Pivoted to the gear 31 at 35 is a dog 36 which is engaged with the periphery of the gear 34 and which is biased into engagement with said periphery by a spring 37 connecting the dog 36 to a pin 38 carried by the gear 31. As shown in Figure 4, the dog 36 is arranged to allow the gear 34 to be rotated counterclockwise relative to the gear 31, but locks the gear 34 to the gear 31 for clockwise rotation, as viewed in Figure 4.

Secured on the shaft 30 is a second reel 39, and encircling the shaft 30 between the reel 39 and the housing side wall 14 is a helically coiled spring 40, one end of the spring being secured to the side wall 14 and the other end of the spring being secured to the reel 39. The spring 40 is wound up when the reel 39 is rotated [counterclockwise] *clockwise*, as viewed from the right side of the housing 12 in Figure 4. Wound on the reel 39 is a cable 41 which extends slidably through the front wall 20 of the housing 12 and which has secured on its ends a knob 42. It will be seen that by pulling on the knob 42, the reel 39 and shaft 30 will be rotated [counterclockwise] *clockwise*, as viewed in Figure 4, causing the spring 40 to be wound up. During this operation [dog 32 locks the gear 31, but the dog 36 allows the gear 34 to be rotated counterclockwise relative to the gear 31. After the knob 42 has been thus pulled outwardly, said knob is released and the spring 40 unwinds, causing the gear 31 to be rotated clockwise, as viewed in Figure 4, since the dog 36 locks the gear 31 to the gear 34 for this direction of rotation. As above explained, the dog 32 is arranged to allow gear 31 to rotate clockwise relative to the housing.] *the dog 36 locks the gear 34 with respect to the gear 31, while the dog 32 allows the gear 31 to be rotated clockwise relative to the housing wall 13.* Clockwise rotation of the gear 31 is transmitted to the gear 29 and to the shaft 24, causing the cable 27 to be wound up on the shaft, the winding up of the shaft 24 being more rapid than the rotation of the gear 31 because of the relatively large gear ratio between gear 31 and gear 29.

*After the knob 42 has been thus pulled outwardly, said knob is released and the spring 40 unwinds, causing the gear 34 to be rotated counterclockwise as viewed in Fig. 4, since the dog 36 will allow rotation of the gear 34 in the counterclockwise direction with respect to the gear 31, which is locked by the dog 32. This effectively resets the device for another anchor lifting and spring winding pull of the knob 42 toward the left, as viewed in Fig. 4.*

Figure 7:
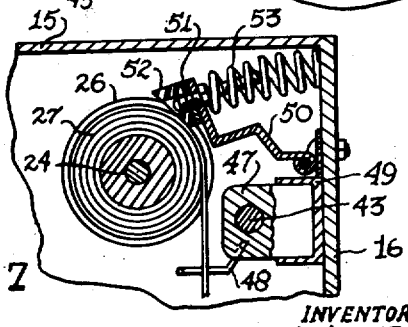
Figure 7 is a fragmentary cross-sectional detail view taken on line 7—7 of Figure 3.
Figure 3:
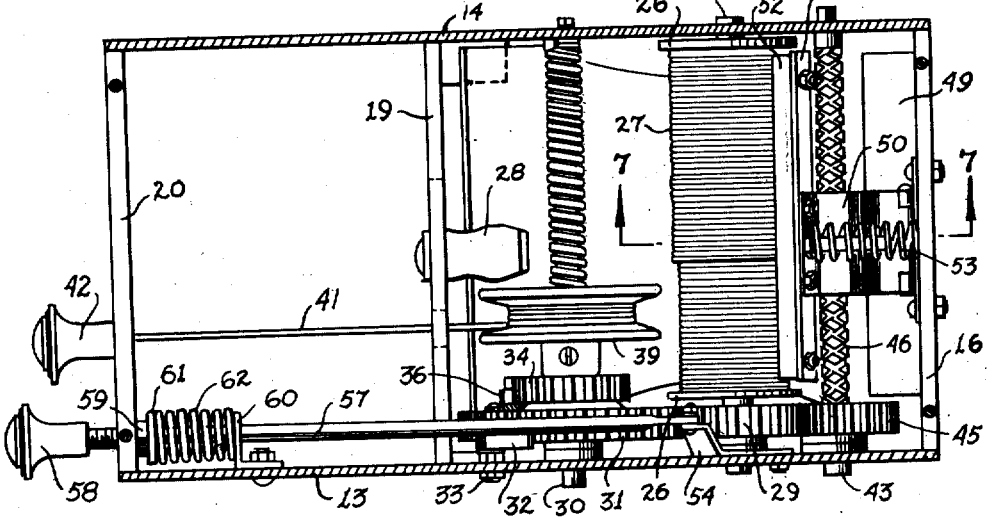
Figure 3 is a horizontal cross-sectional view taken on line 3—3 of Figure 2.

*Designated at 43 is a third transverse shaft mounted between the side walls 13 and 14 of the housing 12, the ends of the shaft 43 being supported in the hole (or slot) means formed in the side walls 13 and 14. In the specific form illustrated, said hole (or slot) means comprises inclined slot means 44 rotatably and slidably supporting the shaft 43.* [Designated at 43 is a third transverse shaft rotatably and slidably mounted in the side walls 13 and 14 of the housing 12, the ends of the shaft 43 being rotatably and slidably supported in inclined slots 44 formed in the side walls 13 and 14.] Rigidly secured on shaft 43 is a gear 45 which is in mesh with the gear 29, as shown in Figure 4. Shaft 43 is formed with the reversed helical grooves 46, and engaged on the shaft is a follower block 47 engaged in a conventional manner with the reverse grooves 46, so as to be moved longitudinally first in one direction on the shaft 43, and then to be reversed in direction after reaching the end of the shaft, so that it traverses the shaft in an opposite direction. The follower block 47 is provided with an eye member 48 engaging around the cable 27 so as to guide said cable longitudinally along the reel defined between the discs 26, 26 so that the cable will be evenly wound on the reel in one direction of rotation of the shaft 24, and will be smoothly unwound from the reel in the opposite direction of rotation. The block member 47 is slidably supported in a transversely extending channeled track member 49 secured to the rear wall 16 of the housing 12, *said block member 47 and the shaft 43 carrying same being mounted for slight forced resilient movement toward the rear wall of the housing 12 and for resilient return to the position shown in Fig. 7 upon removal of applied force. In the particular form illustrated in Fig. 7, said slight forced resilient movement is permitted by reason of the resiliency of the rear wall 16 and/or the rear portion of the follower member 47—said resiliency being such as to allow the extremely slight movement of the shaft 43 necessary to allow disengagement of the gear 29 from the gear 31 when the actuating handle 58 is forcibly actuated toward the right, as viewed in Figs. 3 and 4, thus similarly forcibly moving toward the right, as viewed in said Figs. 3 and 4, the rod*

*57. It should be kept in mind that the required movement is extremely slight and, therefore, the before-mentioned resiliency is adequate to allow this disengaging movement. It is obvious that upon release of the actuating handle 58, said resiliency will immediately return the shaft 43 to its former position, thus also returning the gear 29 (which is also biased by spring 62) into engaged relationship with respect to the gear 31. This is also facilitated by the resilient engagement of the teeth of gears 29 and 45. This comprises one means for allowing the slight forced resilient movement of the shaft 43 so as to allow disengagement of the gears 29 and 31 and to subsequently provide for re-engagement thereof—however the present invention is not limited to this specific arrangement since many other resilient and/or biasing means of generally similar nature may be employed for this purpose without departing from the basic spirit or teachings of the present invention.* Hinged to the rear wall 16 above the track member 49 is an arm 50 which has secured to its free end a transversely extending bar member 51 carrying a rubber pressure strip 52. The bar member 50 is biased counterclockwise, as viewed in Figure 7, by a coil spring 53 bearing at one end on the arm 50 and bearing at the other end on the upper marginal portion of the rear wall 16 in the manner shown in Figure 7, thereby biasing the pressure strip 52 into engagement with the cable 27 wound up on the reel carried by shaft 24.

Designated at 54 is an arm pivoted at 55 to the side wall 13 of the housing. The shaft 24 extends rotatably through the intermediate portion of the arm 54. Pivotally secured at 56 to the top end of the arm 54 is a rod member 57 which extends slidably through the front wall 20 of the housing 12 and has a knob 58 secured on its forward end.

Threaded on the rod member 57 is a nut 59 limiting movement of the rod member 57 to the left, as viewed in Figure 4. Designated at 60 is an angle bracket secured to the side wall 13 of the housing through which the rod member 57 slidably passes. Designated at 61 is a washer mounted on the rod member adjacent the nut 59, and encircling the rod member between the washer 61 and the angle bracket 60 is a coil spring 62 which exerts biasing force on the washer 61, biasing the rod member 57 to the left, as viewed in Figure 4, and thereby biasing the gear 29 into meshing engagement with the gear 31. By exerting pressure on the knob 58, however, the rod member 57 may be moved to the right, as viewed in Figure 4, causing the arm 54 to be swung clockwise, thereby disengaging the gear 29 from the gear 31. The gear 45 and the shaft 43 are simultaneously moved rearwardly, along with the shaft 24, since such movement is permitted by the slots 44 supporting shaft 43. Normally, the gear 29 is locked against clockwise rotation, as viewed in Figure 4, because the gear 31 is locked against counterclockwise rotation relative to the housing by the dog 32. However, when the gear 29 is moved out of meshing relationship with the gear 31, as above described, the gear 29 becomes unlocked and the cable 27 is therefore allowed to freely unwind by the weight exerted thereon by anchor 28.

It will therefore be apparent that to wind up the cable 27 and therefore to elevate the anchor, it is merely necessary to pull the knob 42 outwardly [and then release the knob 42, allowing the spring 40 to unwind, thereby] *thus* causing gear 34 to transmit torque to gear 31 through the dog 36, which causes gear 31 to transmit torque to gear 29 and shaft 24. This winds the cable 27 on the reel carried by the shaft 24. *The knob 42 can then be released, which will cause the gear 34 to move in counterclockwise direction with respect to the locked gear 31 (as viewed in Fig. 4) so as to reset the device for a subsequent anchor lifting pull and spring winding pull of the knob 42. This resetting operation occurs as a result of the force exerted by the spring 40, which is wound each time the knob 42 is pulled and the anchor is lifted.* The above process is repeated as many times as is necessary to wind up the cable 27. When it is desired to release the anchor, the operator merely presses inwardly on the knob 58, thereby freeing the shaft 24 and allowing the cable 27 to unwind by the weight exerted thereon by the anchor 28. *The slot means 25, supporting the shaft 24, and the slot means 44, supporting the shaft 43, allow said shafts to be forcibly resiliently moved rearwardly, to enable the gear 29, to be disengaged from the gear 31. When pressure on the knob 58 is released, the spring 62, the spring 53 and the resilient engagement of the shaft 43 and follower member 47 with respect to the means mounting same causes all of said elements to resiliently move back to their normal positions wherein the gear 29 meshes with the gear 31.* [The slots 25, supporting the shaft 24, and the slots 44, supporting the shaft 43, allow said shafts to be moved rearwardly, to enable the gear 29 to be disengaged from the gear 31. When pressure on the knob 58 is released, the spring 62 and the spring 53 move the elements back to their normal positions wherein the gear 29 meshes with the gear 31.] Since the gear 31 is normally locked against counterclockwise rotation, as viewed in Figure 4, the gear 29 is also normally locked.

While a specific embodiment of an improved boat anchor hoist has been disclosed in the foregoing description, it will be understood that various modifications within the spirit of the invention may occur to those skilled in the art. Therefore, it is intended that no limitations be placed on the invention except as defined by the scope of the appended claims.

[What is claimed is:] *We claim:*

1. In a boat anchor hoist, a frame, a first transverse shaft journaled in said frame, a reel mounted on said shaft, a second transverse shaft rotatably mounted in said frame, a first gear fixed on said second shaft, a second gear fixed on said first shaft, means coupling said first gear to said second gear, said means including an upstanding arm rotatably supported intermediate its ends on said first shaft and having the lower end pivotally connected to said frame, a longitudinally movable means operatively connected to the upper end of said arm for effecting the coupling of said second gear with said first gear, a third gear secured on said second shaft, a first pawl pivoted to said first gear and engaging said third gear, said first pawl limiting rotation of said third gear with respect to said first gear, a second pawl pivoted to said frame and engaging said first gear, said second pawl limiting rotation of said first gear relative to the frame, a second reel secured to said second shaft, and a coil spring encircling said second shaft, one end of said spring being secured to said second reel and the other end of said spring being secured to said frame, said spring being arranged to be wound up responsive to rotation of said second reel relative to said second gear.

2. In a boat anchor hoist, a frame, a first transverse shaft journaled in said frame, a reel mounted on said shaft, a second transverse shaft rotatably mounted in said frame, a first gear fixed on said second shaft, a second gear fixed on said first shaft, means coupling said first gear to said second gear, said means including an upstanding arm rotatably supported intermediate its ends on said first shaft and having the lower end pivotally connected to said frame, and longitudinally movable means operatively connected to the upper end of said arm for effecting the coupling of said second gear with said first gear, a third gear secured on said second shaft, a first pawl pivoted to said first gear and engaging said third gear, said first pawl limiting rotation of said third gear with respect to said first gear, a second pawl pivoted to said frame and engaging said first gear, said second pawl limiting rotation of said first gear relative to the frame, a second reel secured to said second shaft, a coil spring encircling said second shaft, one end of said spring being secured to said second reel and the other end of said spring being secured to said frame, said spring being arranged to be wound up responsive to rotation of said second reel relative to said second gear, a cable wound on said second reel, said cable extending slidably through a portion of said frame, and a head element secured to the end of the cable and being engageable with said portion.

3. In a boat anchor hoist, a frame, a first transverse shaft journaled in said frame, a second transverse shaft journaled in said frame, a gear train coupling said first and second shafts, a first reel secured on said first shaft, a second reel secured on said second shaft, a cable wound on said second reel and extending slidably through a portion of the frame, a head element secured on said cable and being engageable with the outside of said portion, a spring encircling said second shaft, one end of the spring being secured to the frame and the other end being secured to said second reel, first ratchet means carried by the second reel and said gear train, limiting rotation of the second reel relative to the gear train, and second ratchet means carried by the frame and the gear train limiting rotation of the gear train relative to the frame.

ERNEST A. ALDERSON.
WILLIAM L. ADAIR.

References Cited in the file of this patent or the original patent

UNITED STATES PATENTS

| Number | Name | Date |
|---|---|---|
| 1,005,015 | French | Oct. 3, 1911 |
| 1,061,749 | Jennings | May 13, 1913 |
| 2,340,892 | Maynes | Feb. 8, 1944 |